No. 695,305. Patented Mar. 11, 1902.
J. J. GREEN.
ART OF REMOVING FIBER FROM COTTON SEED.
(Application filed Dec. 2, 1901.)
(No Model.)
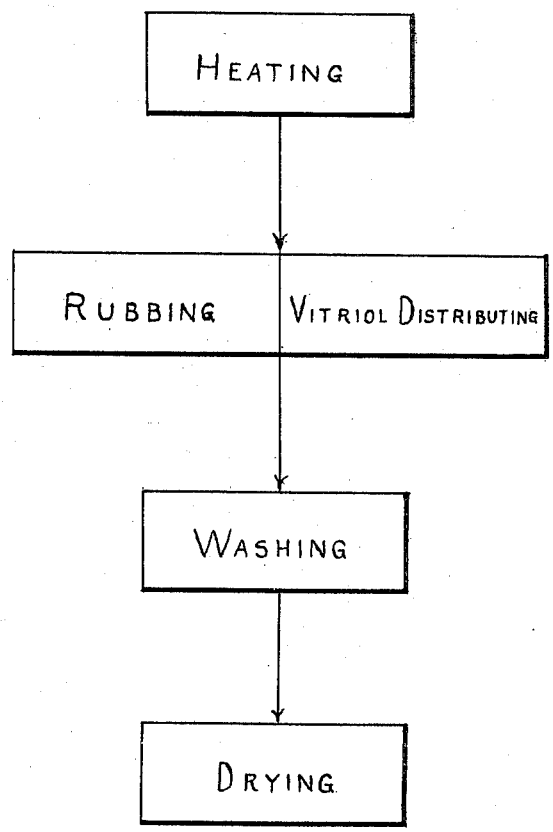
Witnesses
E. K. Lundy Jr.
Inventor
Joshua J Green
By
Attorney

UNITED STATES PATENT OFFICE.

JOSHUA JOSEPH GREEN, OF SHREVEPORT, LOUISIANA.

ART OF REMOVING FIBER FROM COTTON-SEED.

SPECIFICATION forming part of Letters Patent No. 695,305, dated March 11, 1902.

Application filed December 2, 1901. Serial No. 84,459. (No specimens.)

*To all whom it may concern:*

Be it known that I, JOSHUA JOSEPH GREEN, of Shreveport, in the parish of Caddo and State of Louisiana, have invented a new and useful Improvement in the Art of Removing Fiber from Cotton-Seed, of which the following is a specification.

My invention involves the employment of sulfuric acid or oil of vitriol for the purpose of carbonizing the lint on cotton-seed. I am aware that, broadly speaking, it is not new to use oil of vitriol for this purpose.

My invention resides in the special process or mode of procedure devised by me and consisting, essentially, in the four steps of heating and drying the seed, of atomizing strong oil of vitriol onto the seed while hot, of subjecting the seed to rubbing action to remove the successive portions or carbonized fiber and permit access of the vitriol to the part not previously reached by it, and of washing the seed in water to remove the acid. I am enabled in this way to clean the seed effectively and without injury or detrimental effects to them in very short time and with minimum consumption of vitriol, the process being both efficient and economical.

In carrying out my invention the preferred mode of procedure (whose successive steps are illustrated diagrammatically in the accompanying drawing) is as follows: I first heat the seed in a suitable vessel and by suitable means, this being to put the seed in condition in which they will be acted on more efficiently and quickly by the strong acid, for, as I have found, the hotter the seed are the quicker the work is done. I therefore prefer to bring them to as high a heat as can safely be done without danger of parching them—say about 175° Fahrenheit. Having thus heated the seed, I take strong oil of vitriol (the stronger the better) and by known or suitable atomizing appliances distribute it in minutest particles onto the hot seed. It is preferable for this purpose to keep the hot seed in movement during the atomizing operation, so as to insure that each seed shall receive its quantum of the acid. The quantity of oil of vitriol used, however, is small, so small, indeed, that, though atomized in almost invisible particles onto the seed, there is not enough of it to wet the seed through all of its surrounding fibers and gums. The acid thus sparingly distributed affects or carbonizes only the exterior of the seed, and it becomes necessary, therefore, to remove this carbonized exterior in order to permit the successive inner coatings of the seed to be in turn acted on by the vitriol, the latter as the process goes on combining with the carbonized fiber to form a pasty mass with which the successive coatings of the seed should be brought in contact. To this end I subject the seed to a vigorous rubbing action, whereby the carbonized lint on the exterior is removed and the chemical is permitted to get access to the inner coatings of the seed. Many mechanical devices can be used for this purpose. One convenient means is a hollow horizontal revolving cylinder which receives and holds the seed and which as it slowly revolves on its axis "tumbles" the seed, as it were, or, in other words, causes the body of the seed within it to turn over and over with a vigorous rubbing action between the several seeds themselves, the seed on the top at one moment being at the bottom the next, and so on. By this rubbing of the seeds against each other the carbonized lint on their exterior is removed, this combining with the vitriol to form a gummy or paste-like mass, with which the successive inner coatings of the moving seed are brought in contact, with the effect of thoroughly cleaning the seed. This operation under my invention is speedily and effectually performed with a minimum consumption of oil of vitriol and without injury to the seed. After this treatment the seed must be washed to remove the debris and all traces of the acid, and they should then be dried in any usual way.

Having now described my invention and the way in which the same is to be carried into effect, what I claim herein as new, and desire to secure by Letters Patent, is—

The described improvement in the art of removing fibers and gums from cotton-seed consisting in first heating the seed and then distributing strong oil of vitriol onto the hot seed and rubbing the seed against each other to remove successive portions of carbonized fiber and permit access of the vitriol to the successive inner coatings of the seed and subsequently washing the acid from the seed with water, substantially as hereinbefore set forth.

In testimony whereof I have hereunto set my hand this 27th day of November, 1901.

JOSHUA JOSEPH GREEN.

Witnesses:
 HENRY HUNSICKER,
 J. H. LEVY.